March 3, 1959 R. M. M. OBERMAN 2,876,286

ARRANGEMENT FOR THE IDENTIFICATION OF SPECIAL SERVICE APPARATUS REQUIRED FOR CONNECTIONS IN A TELECOMMUNICATION SYSTEM

Filed Sept. 10, 1953 9 Sheets-Sheet 1

INVENTOR.
Roelof M.M. Oberman

BY
Michael S. Striker
Attorney

ARRANGEMENT FOR THE IDENTIFICATION OF SPECIAL SERVICE APPARATUS REQUIRED FOR CONNECTIONS IN A TELECOMMUNICATION SYSTEM

Filed Sept. 10, 1953

INVENTOR.
Roelof M. M. Oberman
BY
Michael S. Striker
Attorney

March 3, 1959 R. M. M. OBERMAN 2,876,286

ARRANGEMENT FOR THE IDENTIFICATION OF SPECIAL SERVICE APPARATUS REQUIRED FOR CONNECTIONS IN A TELECOMMUNICATION SYSTEM

Filed Sept. 10, 1953 9 Sheets-Sheet 3

INVENTOR.
Roelof M. M. Oberman

BY Michael S. Striker
Attorney

March 3, 1959 R. M. M. OBERMAN 2,876,286

ARRANGEMENT FOR THE IDENTIFICATION OF SPECIAL SERVICE APPARATUS REQUIRED FOR CONNECTIONS IN A TELECOMMUNICATION SYSTEM

Filed Sept. 10, 1953 9 Sheets-Sheet 4

INVENTOR.
Roelof M. M. Oberman

BY Michael S. Striker
Attorney

March 3, 1959 R. M. M. OBERMAN 2,876,286

ARRANGEMENT FOR THE IDENTIFICATION OF SPECIAL SERVICE APPARATUS REQUIRED FOR CONNECTIONS IN A TELECOMMUNICATION SYSTEM

Filed Sept. 10, 1953 9 Sheets-Sheet 5

INVENTOR.
Roelof M. M. Oberman

BY Michael S. Striker
Attorney

March 3, 1959 R. M. M. OBERMAN 2,876,286

ARRANGEMENT FOR THE IDENTIFICATION OF SPECIAL SERVICE APPARATUS REQUIRED FOR CONNECTIONS IN A TELECOMMUNICATION SYSTEM

Filed Sept. 10, 1953 9 Sheets-Sheet 6

INVENTOR.
Roelof M. M. Oberman

BY Michael S. Striker
Atty.

March 3, 1959 R. M. M. OBERMAN 2,876,286

ARRANGEMENT FOR THE IDENTIFICATION OF SPECIAL SERVICE APPARATUS REQUIRED FOR CONNECTIONS IN A TELECOMMUNICATION SYSTEM

Filed Sept. 10, 1953 9 Sheets-Sheet 7

INVENTOR.
Rocky R.M. Oberman

BY Michael S. Striker
Attorney

INVENTOR.
Rocky R. M. Oberman

BY Michael S. Striker
Atty

March 3, 1959 R. M. M. OBERMAN 2,876,286

ARRANGEMENT FOR THE IDENTIFICATION OF SPECIAL SERVICE APPARATUS REQUIRED FOR CONNECTIONS IN A TELECOMMUNICATION SYSTEM

Filed Sept. 10, 1953 9 Sheets-Sheet 9

INVENTOR.
Rudolf M. M. Oberman

BY
Michael S. Striker
Attorney 2,876,286

ARRANGEMENT FOR THE IDENTIFICATION OF SPECIAL SERVICE APPARATUS REQUIRED FOR CONNECTIONS IN A TELECOMMUNICATION SYSTEM

Roelof M. M. Oberman, Voorburg, Netherlands

Application September 10, 1953, Serial No. 379,344

6 Claims. (Cl. 179—18)

The present invention relates to an arrangement for providing special service apparatus for connections between stations in a telecommunication system, in particular between subscribers in telephone and telegraph systems.

This application is a continuation-in-part application of my United States application Serial No. 130,394, filed December 1, 1949, now abandoned, entitled "Arrangement for the Identification of a Circuit for Telephone Networks and Independent Characteristics for Each Network."

It is an object of the present invention to identify automatically the special service apparatus of a tele-communication system, the use of which may be required with respect to metering maximum duration of a call, priority in obtaining a trunk, ability to make a particular call such as a trunk call or an international call, etc. Accordingly, the terms "facility" or "facilities" in the present specification refer to apparatus or means for providing specific service facilities of the type listed hereinabove.

It is another object of the present invention to transfer registered facilities from one exchange to another where trunk calls are concerned.

According to one feature of the invention, special service apparatus the operation of which is required for a connection between a calling and a called subscriber station is identified by an identifying circuit under the control of register means indicating the wiper positions of the switches giving access to said calling and called subscriber station, respectively.

According to a further feature of the invention the identity of, or information identifying, the special service apparatus which is required for a connection on a route through a first exchange to which said calling subscriber station is connected, is transferred to another exchange to which said called subscriber is connected, by means of a circuit for converting said identity information into successive time-positions and by a circuit for transmitting said converted information to said other exchange wherein said converted information is reconverted into the original form so that the special service apparatus which is required for a route leading to said called subscriber station, through said other exchange, may be identified.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 2–8 are arranged for a proper reading of the circuit diagram.

Figure 1:
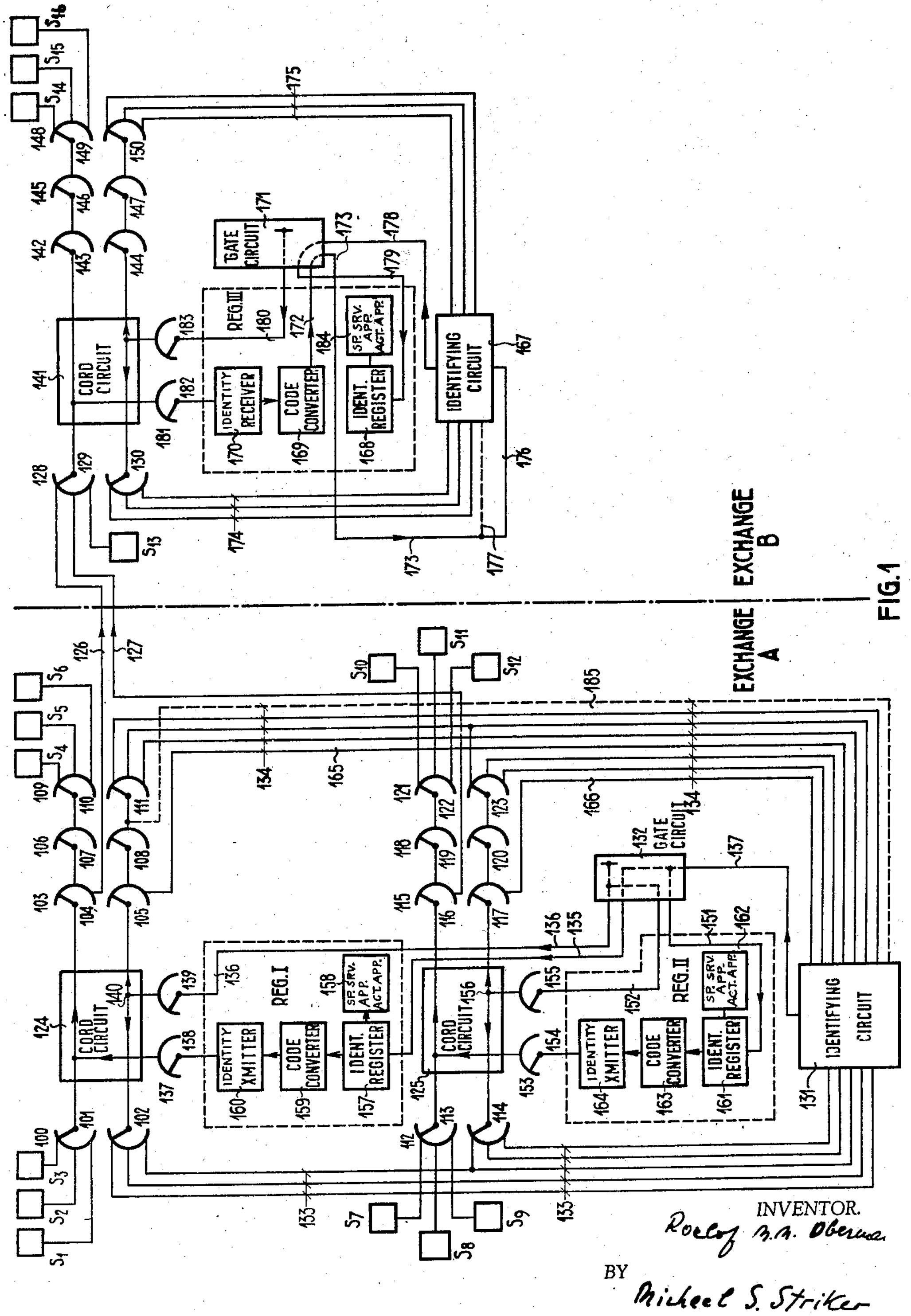
Fig. 1 is a wiring diagram showing the principle of the present invention in two cooperating exchanges partly shown in block diagram and applied to a register system.

Referring to Fig. 1 an exchange A and an exchange B are shown each of which is provided with general positioning means. Since the invention will be explained with reference to a so-called indirect "register" system, the general positioning means will be termed hereinafter "register."

Inasmuch as the present invention does not concern the manner in which connections between subscribers are established nor how the various elements for establishing a connection cooperate, the finders, selectors, subscriber stations, registers and cord circuits are merely shown insofar as they relate to the present invention and for explaining how the various elements cooperate so that anyone skilled in the art may reproduce the arrangement according to the present invention in existing telecommunication systems.

The exchanges A and B are provided with registers of which REG. I, REG. II and REG. III are shown enclosed by dotted block diagrams. For purposes of explaining the invention the exchange A will be considered as a local exchange, and B a trunk exchange.

In Fig. 1 only the subscribers $S_1$, $S_2$, and $S_3$ are shown. These subscribers are connected to a line finder 100. Subscribers $S_7$, $S_8$ and $S_9$ are connected to line finder 112 in exchange A, whereas subscriber $S_{13}$ is connected to line finder 128 in exchange B. In known manner the cord circuit 124 and the register REG. I, or cord circuit 125 and REG. II, or cord circuit 141 and REG. III are engaged when a subscriber initiates a call (e. g. by lifting the telephone apparatus from the hook or by pressing the calling key of a teleprinter) after which the calling subscriber selects, for instance by dialling or by selecting other code signals, the digits corresponding to the number of the called subscriber's station so that if REG. I is engaged, for instance, group selectors 103, 106 and the final selector 109 are directed to the position corresponding to the called subscriber. On the other hand if REG. II is engaged group selectors 115, 118 and final selector 121 will be directed to the position corresponding to the called subscriber. In the same manner the group selectors and final selector of REG. III will be directed to the position corresponding to the called subscriber if REG. III is engaged. The subscriber stations $S_4$, $S_5$, $S_6$, $S_{10}$, $S_{11}$, $S_{12}$ as well as $S_1$, $S_2$, $S_3$, $S_7$, $S_8$ and $S_9$ are subscribers to the exchange A whereas $S_{13}$ to $S_{16}$ inclusive are subscribers to exchange B. The exchange A is connected to the exchange B as a subscriber over the trunk line 126 and 127 extending from the first group or trunk selectors 103 and 115 respectively in exchange A to the call or trunk finder 128 in exchange B.

In a four-digit exchange such as illustrated in exchange A, approximately $2\times10^9$ different connections can be established. Not each of the different connections are provided with different special service apparatus. In the arrangement according to the invention groups of subscribers may be provided with the same special service apparatus.

The special service apparatus provided in conjunction with a connection which is coded in digits are automatically placed into operation and identified by an identifying circuit indicated by the rectangle 131. The identifying circuit has connected thereto a plurality of conductors from the called end of the line and a plurality of conductors from the calling end of the line, each of the conductors making up the multiple conductors being coded by digits. An embodiment of the identifying circuit is disclosed in greater detail hereinafter with references to Figs. 2 to 8 and 9.

In a four-digit exchange the thousands digit and hundreds digit define the position of the first and second group selectors, respectively, while the tens and units digits define the position of the final selector. The selectors may thus be termed stages for the selection of call digits or other characteristic features of the subscriber. Efforts have been made to reduce the number of stages or the required characteristic features and data by enlarging the number of outlets of a selector in view of the Erlang theory. For example a selector with 10,000 outlets enables connections to be made with only two selectors on the basis of two characteristic features, namely one for calling subscribers and one for called subscribers. The identifying circuit in accordance with the invention is supplied with means for handling two characteristic features i. e. that of the calling subscribers and that of the called subscribers.

Inasmuch as it is an object of this invention to provide an arrangement for identifying the required special service apparatus within existing automatic telecommunication systems it becomes a problem to determine where the call digits of the calling stations and the call digits of the called stations are to be located and whether both groups of call digits could possibly be reduced to one group. In the type of register in which all call digits that are transmitted by the calling subscriber are stored by marking means, such as marking switches or relay arrangements which only return to their respective basic positions after a connection has been built up, the marking means may serve as a switch having 10,000 outlets, if a four-digit system is used. In the system according to the invention the positioned selectors indicate the connections made between a calling subscriber and a called subscriber.

The requirements of a register in which the digits transmitted by the calling subscriber are stored by marking means cannot be met by impulse positioned telecommunication systems since the marking means return to their basic position after the positioning of the respective selector and therefore the digits transmitted by the calling subscriber cannot possibly be stored.

There are three possible ways in which the requirements of a register in which the digits transmitted by the calling subscriber are stored by marking means can be met. The first possible way is by positioning the selectors only after the digits transmitted by the calling subscriber are received. The second way is by providing extra switches for transferring the position of a corresponding selector, and the third way is by employing relay selectors. These relays should be preferably slow operating holding relays which store the digits until the register is released.

The three ways outlined above all require much more register equipment than is currently in use in present day systems. The first way outlined above and which involves the positioning of the selectors only after the digits transmitted by the calling subscriber are received, requires the installation of more identical registers since the engagement time increases. The second way, which involves the provision of extra switches for transferring the position of corresponding selectors, requires twice as many marking switches and positioning apparatus as presently used in registers. The third way, which involves a relay selector, requires twice as many relays for the relay counting chain as would oridinarily be necessary.

The connection of the calling station may be identified by the register or determined at the metering equipment. However, identifying a connection in a register has a drawback since no indication is obtained as to which outlet of the group selectors is in engaged condition in a particular connection. Such indication is important in direct and overflow trunks since it is of the utmost importance that if a subscriber does not have the opportunity of using a last available outlet, or one of the last available outlets, in a connection to be completed, such inability should be clearly indicated.

If a cross bar system is used the marker may identify the connection. However the use of a crossbar system has the disadvantage that the markers will be engaged for too long a time period to meet the demand made by other calls.

A direct system gives the indication concerning only the connection established by the positioned selectors. The identifying circuit for identifying the special service apparatus required with a particular connection will thus have to cooperate with the connections to be established as is clear from the above. How the cooperation is effected will be explained in greater detail hereinafter.

The special service apparatus required for a connection must be identified before the connection between a calling subscriber and a called subscriber is established. If connections were permitted to be established before the identification of the required special service apparatus, it would be possible that the connection is discontinued or interrupted, or replaced by a different one, prior to the identification of the particular special service apparatus. This is highly undesirable. Therefore no connection should be established before the identification of said connection. The location of the identifying circuit for a register system may be chosen either in the register itself, or beyond the register in which case the identifying circuit cooperates with the register. The location of the identifying circuit in the register has a drawback, namely, separate identifying circuits must be provided for each connection to be identified and therefore this involves a great number of parts owing to the number of connections to be identified. As already stated groups of connections may be provided with the same special service apparatus or combinations thereof. The identification of groups of connections is preferable to the identification of individual connections, but would require more than one identifying circuit, since the identification of groups of connections is subject to the Erlang theory in which case the register will have to ascertain whether the identifying circuit is available for a connection.

According to the invention one identifying circuit is used which is common to a plurality of registers in an exchange. The gate circuit 132 insures a connection of a single register to the identifying circuit and prevents a connection of any of the remaining of the plurality of registers to the gate circuit while the particular single register is connected thereto. If desired, instead of the registers, the cord circuit could be connected to the identifying circuit. The cooperation between the registers and the identifying circuit provides greater advantages than the cooperation between the cord circuits and the identifying circuits for the reason that, firstly, the number of registers which need be used is smaller, and secondly, the registers may transmit to, and receive from other exchanges the determined identity of the particularly involved special service apparatus.

Where direct or bypass systems, such as systems employing crossbars are concerned, one must insure the cooperation between the connecting circuit and the identifying circuit in order to make possible, for example, the cooperation between the registers and the identifying circuit and the cooperation between exchanges. Such cooperation may be obtained by, and for all practical purposes be considered as established by, a register or marker as will be clear to any person skilled in the art.

In Fig. 1 the line finders 100 and 112 are illustrated as having two contact banks and associated wipers 101, 102 and 113, 114, respectively. The selectors 103, 106, 109, 115, 118 and 121 each have two contact banks and wipers 104, 105; 107, 108; 110, 111; 116, 117; 119, 120; and 122, 123; respectively. The upper of the contact banks of each respective finder and selector in conjunction with the conductors connected to the contact banks constitute available circuits for the speech conductors, while the lower of the contact banks of each respective finder and selector in conjunction with the conductors connected to its contact banks constitute available circuits for the identification circuit. The contact banks 102, 114 and contact banks 111 and 123 are connected in group multiples 133 and 134 respectively to the identifying circuit 131. The gate circuit 132 effects the connection of only one of a plurality of registers to the identifying circuit at which time the register sets the identifying circuit in operation. The connecting circuits extend from the gate circuit 132 to REG. I over conductor 136, wiper and contact bank 139 of the cord finder 137, point 140 in the cord circuit 124, wiper's position on contact banks 105, 108, 111 of the first group selector 103, the second group selector 106, and the final selector 109 respectively, over the multiple 134, and from point 140 over wiper and contact bank 102 of the line finder 100, over the multiple 133 to the identifying circuit 131 which supplies the identification over the single output lead 137 of the identifying circuit back to the gate circuit 132 and to the register REG. I by means of the conductor 135.

If on the other hand REG. II causes the operation of the identification means the circuit will be seen to extend from the gate circuit 132, the conductor 152, REG. II, wiper and contact bank 155 of the cord finder 153, point 156 in the cord circuit 125, contact banks 117, 120 and 123 and wipers associated therewith of the first group selector 115, a second group selector 118 and the final selector 121 respectively, the multiple 134. At the same time the circuit extends from point 156 in the opposite direction over the wiper and contact bank 114 of the finder 112, the multiple 133, the identifying circuit 131, single output lead 137 of the identifying circuit back to the gate circuit 132 and finally conductor 151 leading back to the register REG. II.

The identified special service apparatus are registered by identification registers 157 or 161. These registers form part of the local or trunk register i. e. REG. I or REG. II. The identification registers 157 or 161 feed a special service apparatus actuating apparatus located in boxes 158 and 162, respectively. This actuating serves to meet with demands for, and to actuate special service apparatus as demanded, such as in the case of the release of a connection to be established, or of the connection of metering devices to the cord circuit, etc.

If one of the subscribers $S_1$, $S_2$, $S_3$, $S_7$, $S_8$, or $S_9$ wishes to be connected to a trunk register such as REG. III, the subscriber merely by dialling can effect the positioning of the trunk selector 103 or 115 by REG. I or REG. II, respectively so that a connection may be established over line 126 or line 127 respectively. The special service apparatus required for the subscribers making such a call are then identified for the calling station in a manner already indicated hereinabove. The particular special service apparatus are identified for the called station over the trunk selector 103 or 115 over conductors 165 or 166 respectively of the multiple 134. In general, the determination as to which connection of the multiple 134 will be connected to the identifying circuit 131 is determined by the digits used for positioning selectors. Each selector having outlets leaving the exchange has access to the multiple 134 over another bank or over one of the banks in the speech circuit which is not completed before the desired connection is established. The connection is established by means of a cut-off relay the energization of which takes place upon interruption of the connection to said multiple.

When the outgoing connection via lines 126 or 127 is made the register REG. I or REG. II will inform the gate circuit 132 then an identification of a connection is to be made in a manner to be explained hereinafter. If no other register is connected to the identifying circuit, the gate circuit 132 will connect the relevant particular involved register, either REG. I or REG. II to the identifying circuit 131. The register connected to the identifying circuit is the "calling" register. The gate circuit therefore acts to establish an electric circuit which includes the particular register and the identifying circuit as explained hereinabove. As already noted the identified special service apparatus required for the connection, identified by the identifying circuit 131, are registered in the identification register 157 or 161. The identity of such registered special service apparatus is transferred to apparatus located in box 158 or 159 where the desired special service apparatus are actuated. Examples of special service apparatus the identity of which may be transferred are e. g. the control means of a cord circuit, means for making possible the establishment of a connection, means for connecting metering devices to a cord circuit, etc.

The registers such as REG. I and REG. II are also provided wtih identity transmitters 160 and 164 respectively which come into action if another register, for instance a trunk register, is wanted. If a trunk register is desired then REG. I or REG. II is connected over the trunk selector 103 or 115 respectively to a trunk register such as REG. III. In this manner the identity of identified special service apparatus may be transmitted to REG. III. The register REG. III which is located in exchange B is reached over trunk finder 128. It is possible for the register REG. III to be a trunk register in exchange A in which case the trunk selectors 103 and 115 will have access to a cord circuit in exchange B. In the latter case the need for the trunk finder 128 is eliminated.

The register REG. III is made available to the calling exchange or station so that the finder 128 and the cord finder 181 are suitably positioned for connecting the register REG. III to the calling exchange or station. The identity transmitters, such as 160 or 164 transmit at a predetermined time, the identity of special service apparatus identified in exchange A to an identity receiver 170 located in the register REG. III. Located in REG. I and REG. II between the identifying registers 157, 161, and the identity transmitters 160 and 164 respectively are code converters which render the identity of registered apparatus susceptible to transmission when the identity of such apparatus is registered in a code which is different from the one in which the transmission is to be made. The code converters in Fig. 1 are indicated by the rectangles 159 and 163 for REG. I and REG. II respectively. The operation of the code converter will be clarified hereinafter. Instead of inserting the code converter as indicated in Fig. 1 between the identifying register and the identity transmitter it is also possible, as will be clear to any person skilled in the art, to convert the code in the identifying circuit 131 or between the identifying circuit 131 and the identification registers such as 157 and 161. These possibilities are illustrated in the drawing since in the latter case the code converter would become part of the identifying circuit in which case the rectangles 159 and 163 simply form a connection between the identification registers and the identity transmitters in the respective registers.

The register REG. III receives by means of the identity receiver 170 the identity of special service apparatus identified in exchange A. The received identities of special service apparatus are registered by the identification register 168, which however, does not take place while the identity transfer apparatus 184 is transferring the apparatus identities determined in exchange B. The apparatus in box 184 is similar to the apparatus described with relation to boxes 158 and 162. If necessary it is possible to re-establish the identity of special service apparatus determined in exchange A and combine those identities with the identities determined in exchange B. For this reason it is advantageous to apply the identities received from exchange A to the identifying circuit 167 in exchange B.

If the register REG. III is located in exchange B a trunk finder 128 must be employed as already indicated. The calling part of a connection is determined by the position of the cord finder 181 and the trunk finder 128. If however, no trunk finder is used the engaged cord circuit 141 and the position of the cord finder 181 will indicate the calling part of the connection in exchange B. The calling part of the connection is identified in a manner similar to that explained with reference to the identification of a connection in exchange A, that is, over the bank and wiper 183 of the cord finder 181, cord circuit 141, wiper and bank 130 of the trunk finder 128, multiple 174 which is connected to the identifying circuit, the multiple 175, wipers and banks 150, 147 and 144 of the final selector 148, and group selectors 145 and 142 respectively, and back to the bank and wiper 183 of the cord finder 181.

As already noted the selectors may be termed stages for selection of call digits or other characteristic features of the subscriber station. Two selectors correspond to two characteristic features, the first feature being characteristic for the calling subscriber and the second feature being so for the called subscriber. It is however possible to supply a third characteristic feature which may be added to form a circuit including a code converter 169 and conductor 172 which is connected by the gate circuit 171 to the conductors 173 and 176 which form a multiple connected to the identifying circuit 167. The identifying circuit may in this manner receive the identities to be re-determined over the multiple 176 or over the existing multiple 173 represented by the dashed line 177. If desired, however, the identification of the calling part of the connection in the case involving a third characteristic may be omitted and replaced by the received identities from exchange A so that the identification remains based on only two characteristics. Whether the telephone system should use two characteristics or three characteristics depend entirely on the nature of the system to which the arrangement according to the invention is to be applied.

The identities of special service apparatus determined in exchange B are transferred by means of conductors 178 and 179 which are linked by the gate circuit 171 to the identification register 168 and from the register 168 to the apparatus actuating means 184 which contains devices for transferring the identity of special service apparatus to the proper parts of the telecommunication system. Before describing in greater detail the necessary elements and the cooperation thereof in connection with a register system, which affords to the subscriber better service and requires less apparatus in the exchange resulting at the same time in an operation which is as rapid as that obtained with direct and crossbar systems, it should be noted that if impulse positioning is used the pulse-carrying wire itself may be used for testing the special service apparatus of a connection.

In some instances it may be advantageous to connect the identification multiples not only to the finders and selectors having outlets leaving an exchange but also also to the outlets of group selectors or even cord finders in order to facilitate the identification of the routes seized within an exchange. This connection is indicated in principle by the dotted line 185 in the multiple 134, the dotted line extending from the shown outlet of group selector 106 to the identifying circuit 131 in exchange A.

Figure 4:
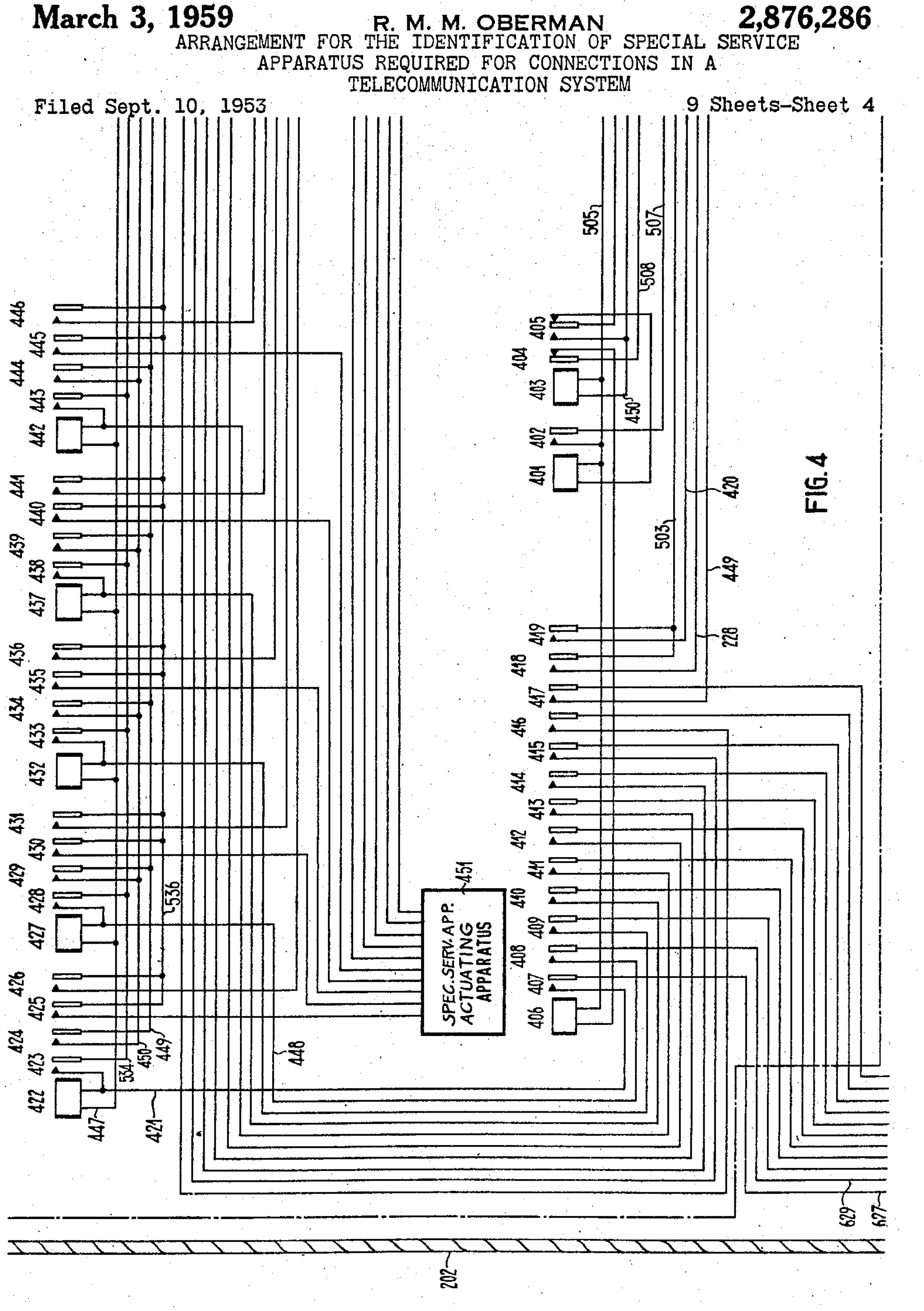
Figure 5:
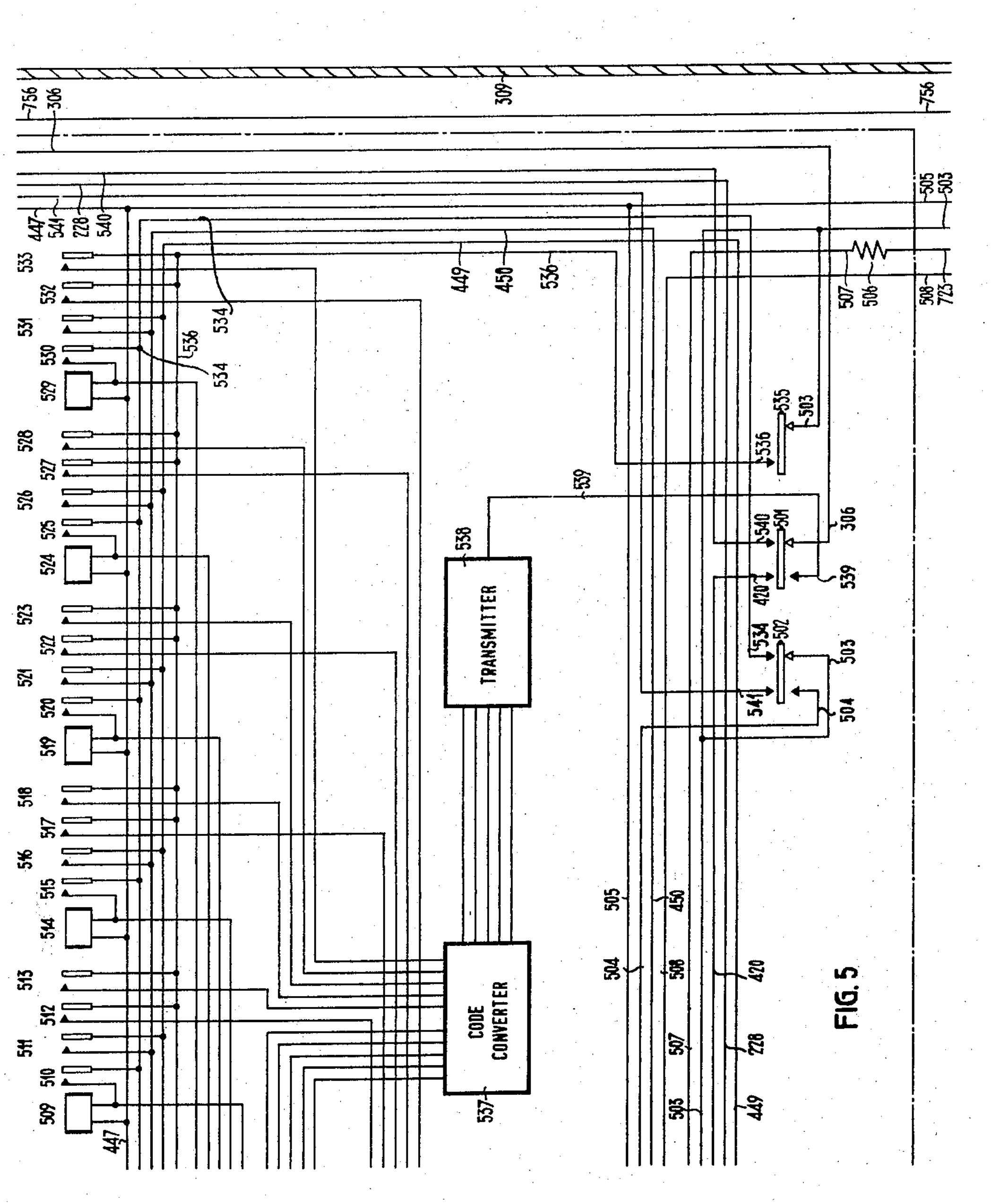
Figure 6:
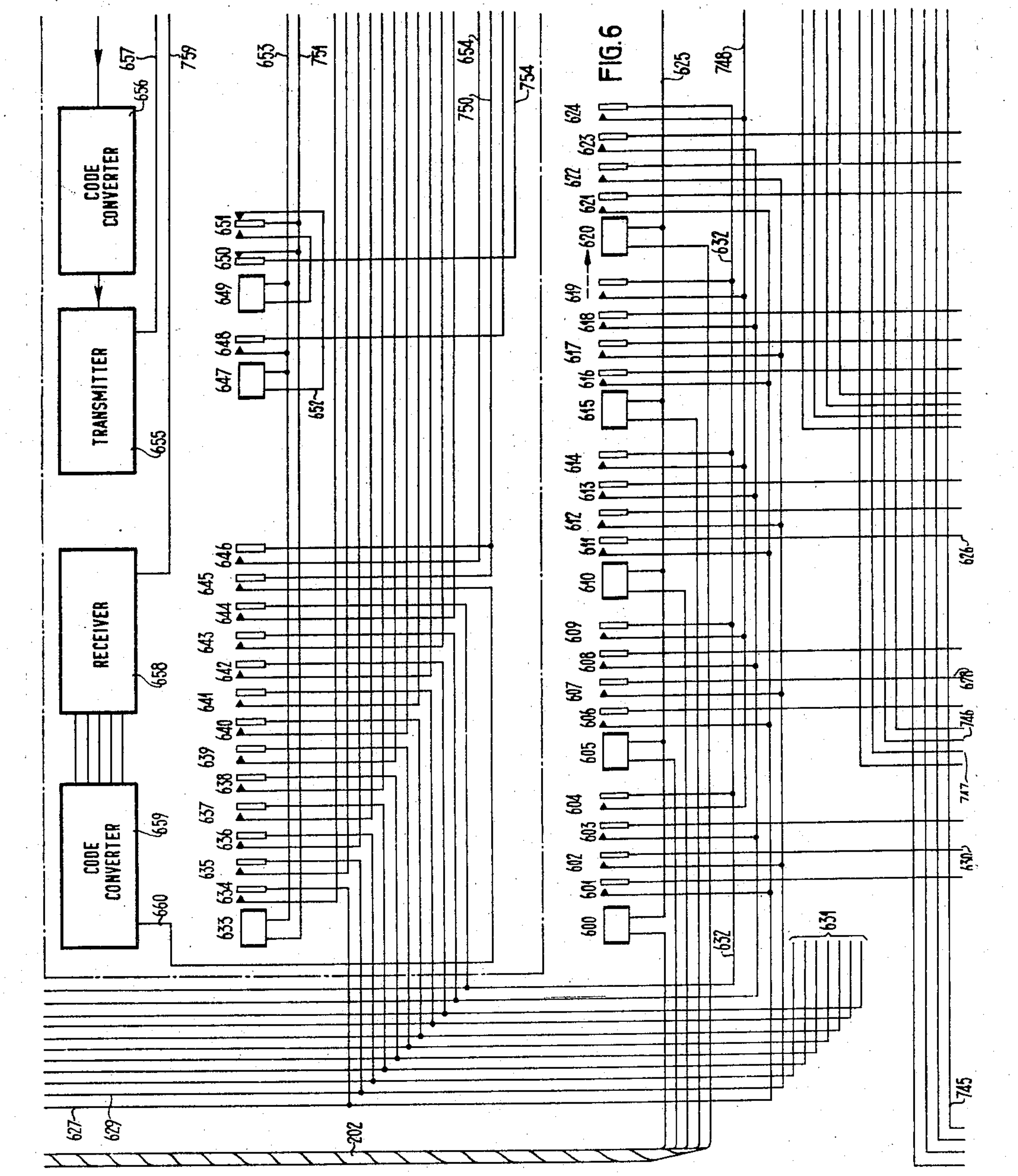
Figure 7:
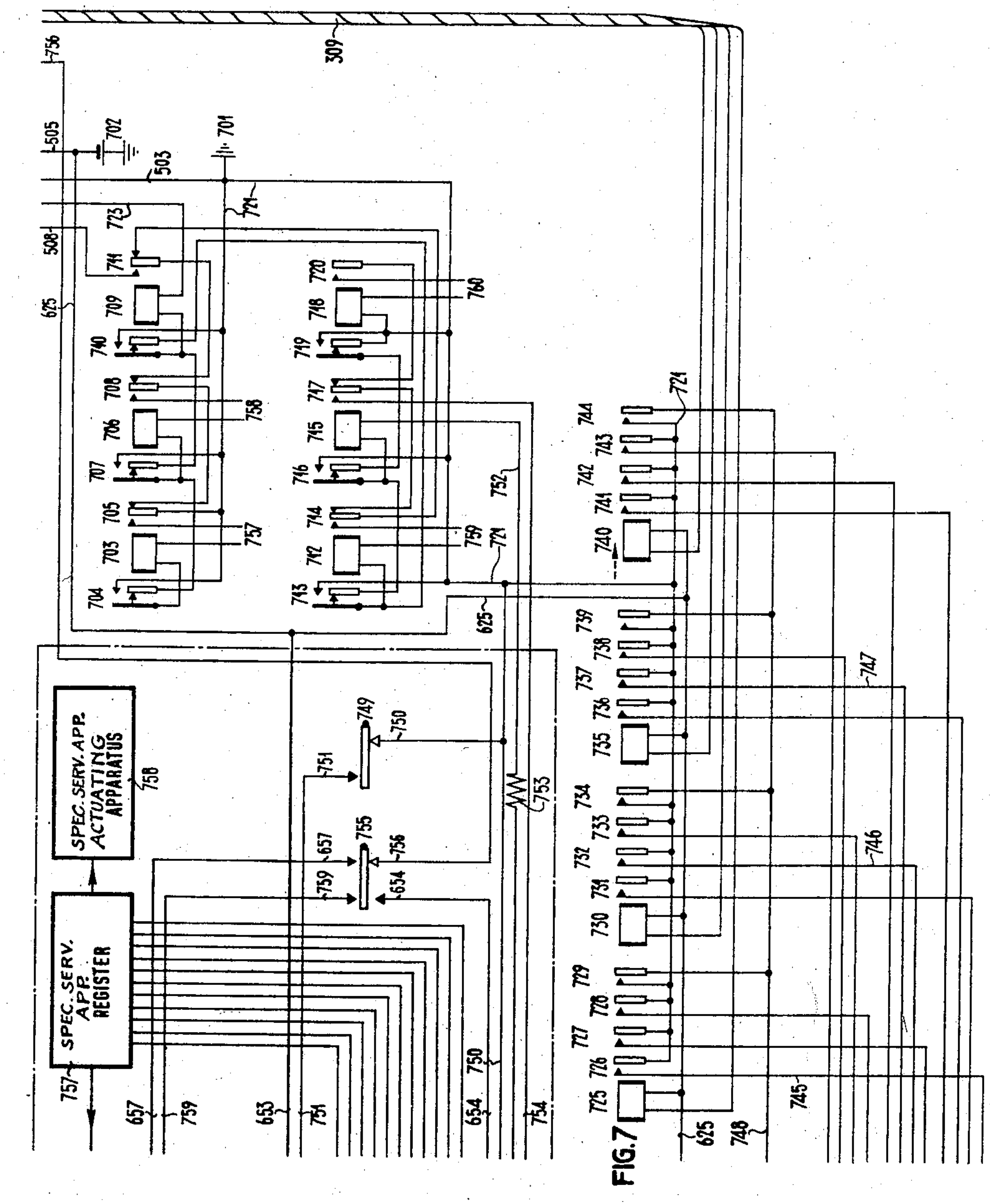

Figs. 2 to 8 illustrate an embodiment of the identification circuit in a register system. Two registers are shown, the first one being represented in Figs. 2 to 5 inclusive and the second one in the upper part of Fig. 6 and the upper left-hand part of Fig. 7. The lower part of Figs. 6 and 7 illustrate the relays for operating the identifying circuit. The gate circuit of the exchange is shown in the upper right-hand part of Fig. 7.

Figure 2:
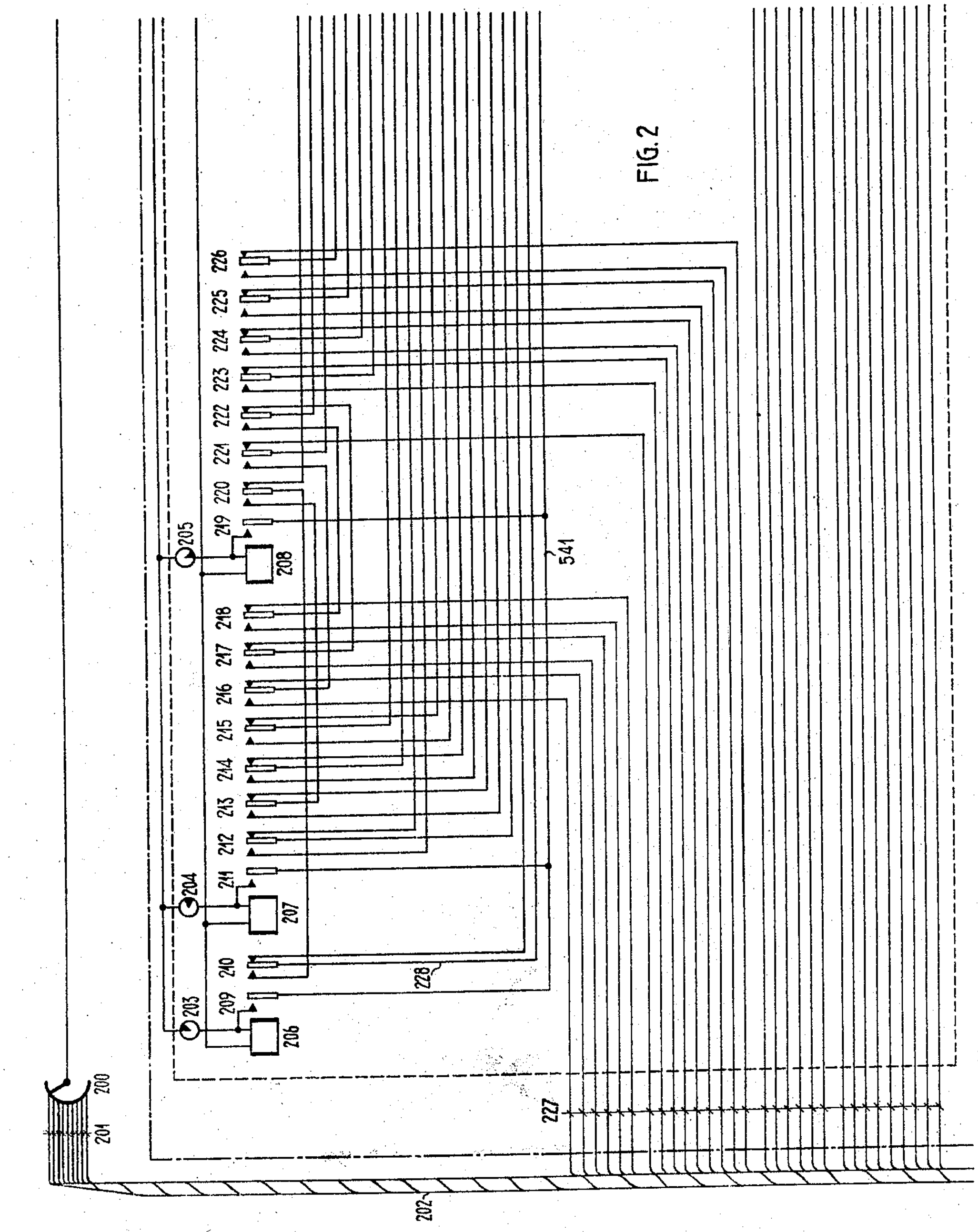
Figs. 2, 3, 4, 5, 6, 7 and 8 are more elaborate diagrams of an embodiment of the present invention and the way in which it may be utilized in an existing telecommunication system.
Figure 3:
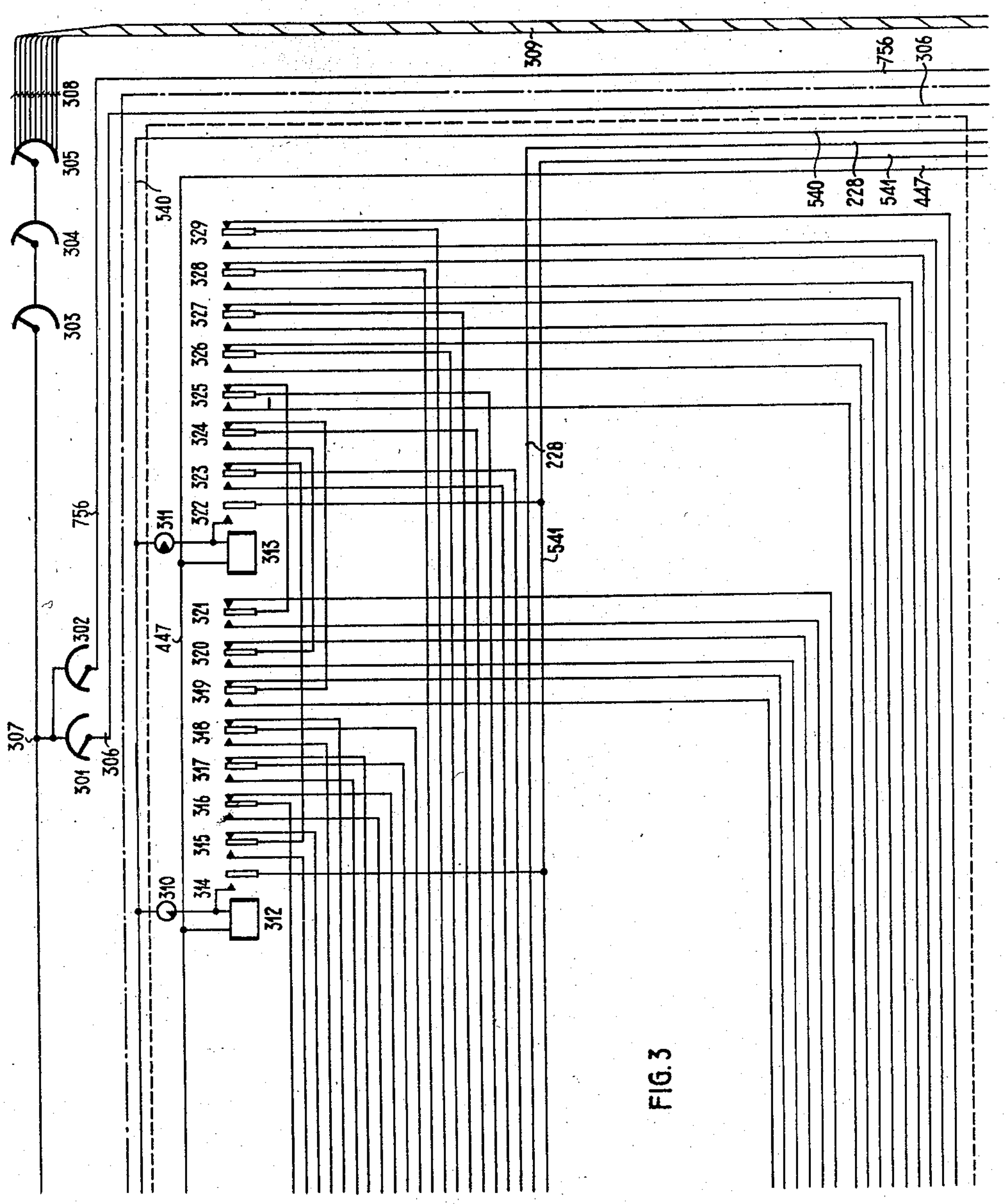

Illustrated at the top of Figs. 2 and 3 is a selector circuit which is positioned in known manner for effecting a connection between two subscribers. The selector circuit comprises a line finder 200, a cord finder 301 (in case the first register shown in Figs. 2 to 5 inclusive is made available for the call) or a cord finder 302 in case the second register shown in Figs. 6 and 7 is available for effecting the connection between two subscribers, a first group selector 303, a second group selector 304 and the final selector 305. The subscribers are not illustrated. However, the subscribers may be connected in a manner similar to that set forth with reference to Fig. 1. It is possible to use line finder 200 and cord finders 301 and 302 as identification switches in the registers while first group selector 303, second group selector 304 and final selector 305 may be used as marking switches since this does not involve any departure from the basic arrangement according to the present invention. If finders and selectors are used, the connection between two subscribers is established only after the register has performed all its functions including the function of registering the identified special service apparatus. The wiper of the cord finder 301 is connected by means of conductor 306 to a cam of a sequence switch in the first register. When the selectors 303, 304 and 305 have reached the positions effecting the connection of a desired subscriber the sequence switch 502 connects ground to relay 401. When relay 401 is energized the engagement of the identifying circuit is initiated. The energization of the relay 401 takes place through a circuit running from ground, conductor 503, cam 502 of a sequence switch, conductor 504, back contact 405 of relay 403, relay 401, conductor 505, battery 702 and to ground. Relay 401 upon energization thereof attracts its armature and closes contact 402, thus preparing the circuit for the relay 709 arranged in the gate circuit. Relay 709 upon energization thereof connects the register illustrated in Figs. 2 to 5 inclusive to the gate circuit and if no other register is connected to the gate circuit the connection of the register to the identifying circuit will be effected in a manner to be more fully explained hereinafter. Each of the registers in an exchange has a relay associated therewith in the gate circuit so that the registers may be connected to the identifying circuit individually by the action of the gate circuit.

As noted, the gate circuit is arranged so that only one relay corresponding to one register is energized at a time, the energization circuits for the other relays in the gate circuit being interrupted. The gate circuit is provided with relays such as 703, 706, 709, 712, 715 and 718. The number of relays in the gate circuit corresponds to the number of registers having access to one identifying circuit. When the first register calls for the identifying circuit the relay 401 closes contact 402 and a circuit will be completed, if the gate circuit is available, from ground at 701, conductor 721, armature and movable contact of the make-before-break contact device 719 which is controlled by relay 718, armature and movable contact of make-before-break contact device 716, armature and movable contact of make-before-break contact 713, armature and movable contact of make-before-break contact 710, winding of relay 709, conductor 723, resistor 506, conductor 507, closed contact 402, conductor 505, two batteries 702 and ground. The relay 709 in the gate circuit now attracts its armature. The resistor 506 may be a relay which is operated when the register is connected to the identifying circuit by means of the gate circuit.

When the relay 709 attracts its armature the make-before-break contact device 710 bridges the series of break-before-make contacts 719, 716, and 713 by directly connecting the winding of relay 709 to conductor 721 and thus to ground at 701. When this occurs ground is disconnected from the movable contact and armature of the make-before-break contact 707 and 704. The relays 703 and 706 cannot operate under this condition and thus a relay corresponding to relay 401 can only prepare a circuit for said relays 703 and 706 which can be operated when the ground supplied over conductor 721 and make-before-break contact 719 reaches the windings of relays 703 and 706.

The contact 711 switches over after energization of relay 709 and applies ground to the winding of relay 406 in a circuit extending from ground at point 701, conductor 721, back contact 705, back contact 708, front contact 711, conductor 508, back contact 404 of relay 403, one end of the winding of control relay 406, the other end of the winding of relay 406 being connected to battery 702 by means of conductor 505 and back to ground. As a result control relay 406 will operate and attract its armature thereby closing contacts 407 to 419. Contact 419 connects conductor 503, which is connected to ground at 701, to the cam 501 of the sequence switch by means of conductor 420. The cam 501 then closes the connection to the cord finder 301 over conductor 306 as explained above. The point 307 which is located in the cord circuit in turn connects ground to the positioned line finder 200 and the selectors 303, 304 and 305.

For purposes of illustration, it will be assumed that 30 different calling and 30 different called subscribers or stations exist in a connection system. In general, the number need not be limited to 30.

The position of the finder 200, or rather the group to which the calling part belongs is determined over the multiple 202 and by the energization of one of the plurality (30 in this case) of relays 600, 605, 610, 615, 620, etc. The position of the final selector 305, or rather the group of outlets to which the final selector belongs is determined over the multiple 309 to the relays 725, 730, 735, 740, etc.

Every call finder has outlets connected to the multiple 202 over conductors 201. The same applies to the final selectors which have outlets connected to the multiple 309 by means of conductors 308.

Assuming that ten different special service apparatus and combinations thereof exist, then ten different combinations of the groups of calling and called subscribers or stations in a connection system must be identified. Only three such combinations have been illustrated in Fig. 8. The identifying circuit is provided, for example, with panels having crossing conductors. The particular connections made with the crossing conductors depend on the type of special service apparatus desired. The panels have horizontal conductors which are connected to a battery terminal. The particular conductor connected to the battery terminal depends upon which of the relays 725, 730, 735, 740, etc. have been energized. The vertical conductors are connected by the relays 600, 605, 610, 615, 620, etc. to the special service apparatus register, the particular vertical conductor connected to the register being dependent on which of the relays 600, 605, 610, 615, 620, etc. is energized. It is obvious that the functions of the relays 600, 605, etc. and 725, 730, etc. respectively may be interchanged without departing from the scope of the present invention. Nor is the invention to be restricted by the designation of horizontal and vertical conductors since the latter terms are used in an effort to describe the invention as clearly as possible with reference to the drawing.

The panels in the identifying circuit operate as a selector for the identification of the special service apparatus in cooperation with the relays 600, 605, etc. and 725, 730, etc. The panels are represented by numerals 800, 820 and 840 in Fig. 8. Only three of these panels have been shown for the purposes of explaining the present invention. Since the panels cooperate with the relays 600, 605, etc. and 725, 730, etc. for the identification of the special service apparatus, it is immaterial whether a crossbar switch or any other relay selector is used. It is also possible to consider the panels as connecting circuits which connect calling and called subscribers or stations of a connection system, while the connection of the panels with the special service apparatus register and the gate circuit may be considered as a connection with the register over a cord finder. This is true since the identification of the connection might be made in the cord circuit as explained hereinabove.

Each panel covers one special service apparatus and since a choice must be made as to whether a particular special service apparatus is desired or not for a particular connection to be established, it is necessary to calculate whether the special service apparatus will be required for more or less than half of the possible connections on a single panel. If more than half the possible connections on one panel indicates the non-availability of a special service apparatus, then it may be arranged that the availability of such an apparatus is indicted by a connection between a horizontal and a vertical conductor. In other words, the connections between the horizontal and vertical conductors are chosen so that their number amounts to less than half the number of possible connections.

In view of the possibility of undesired connections, to be explained hereinafter, the panels preferably make use of the arrangement disclosed in patent application Serial No. 35,503, filed on June 26, 1948, and constitute a partial matrix which is a plurality of small matrices combined so as to form one large partial matrix.

Figure 8:
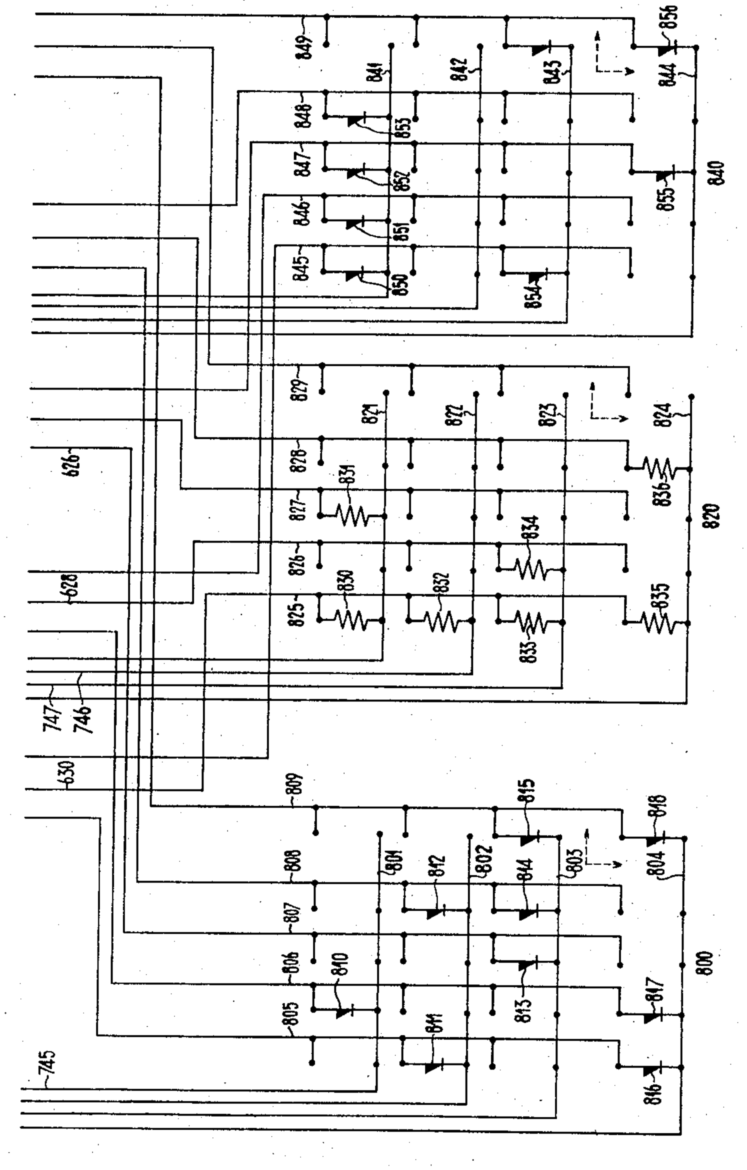

Should a connection between the horizontal and vertical conductors be made by means of strips or stoppers having an ohmic resistance of the order of the electrical conductors or less, undesirable connections may result due to the low ohmic resistances of elements in the network such as rectifiers 810—818 illustrated in Fig. 8.

Assuming now that the finder (or the identification switch) 200 is positioned so that relay 610 is operated in the circuit extending from ground 701, conductor 503, contact 419 of control relay 406, conductor 420, cam 501 of a sequence switch, conductor 306, wiper and bank 301 of the positioned cord finder, point 307 in the cord circuit, finder 200, the conductor on which the finder is positioned in the group 201, multiple 202, winding of relay 610, conductor 625, battery 702 and back to ground. It is further assumed that the final selector (or the corresponding marking switch) 305 is positioned so that relay 725 is energized in a circuit extending from ground 701, conductor 503, contact 419 of the relay 406, conductor 420, cam 501 of the sequence switch, conductor 306, wiper and bank 301 of the positioned cord finder, point 307 in the cord circuit, first group selector 303, second group selector 304, final selector 305, the conductor on which the final selector is positioned in the group 308, multiple 309, winding of relay 725, conductor 625, battery 702 and back to ground. Relay 725 applies ground to the horizontal conductor 801 by means of its contact 726 in a circuit extending from ground at point 701, conductor 721, contact 726, conductor 745, to the horizontal conductor 801. The vertical conductor 807 is connected to the special service apparatus relay 422 in the special service apparatus register in a circuit extending from vertical conductor 807, conductor 626, contact 611 which closes upon the energization of relay 610 which has been assumed to have been energized by the positioning of the finder 200, conductor 627, contact 407 which is closed by control relay 406 owing to the closure of the energization circuit thereof by the gate circuit, conductor 421 to the winding of relay 422.

If low ohmic resistances in the form of rectifiers such as 810—818 are used, full ground is applied to one end of the winding of relay 422 since the ground on conductor 801 reaches conductor 807 in a circuit including rectifier 810, conductor 806, rectifier 817, conductor 804, the parallel path including rectifiers 816 and 818, conductors 815 and 809 respectively, rectifier 811 along the left hand path, conductor 802, rectifier 812, and along the right hand path, rectifier 815, rectifier 814, and rectifier 813 to conductor 807. The other end of the winding of relay 422 is connected over conductors 447 and 505 to battery 702 and ground. It is apparent that in addition to conductor 807, however, the conductors 805, 806, 808 and 809 also receive full ground. No serious difficulty arises since only relay 422 is operated by panel 800. The difficulty arises, however, if other conductors in other panels should be grounded since in that case more than one relay in the special service apparatus register would be energized, thus giving misleading information. For this reason a low ohmic resistance cannot be used to form part of the connections in the panels in accordance with the present invention. Instead of using the low ohmic linear resistances illustrated in panel 800, a second possibility will be illustrated in connection with panel 820. It is assumed that the elements 830—836 consist of resistors having an ohmic value $\Omega_R$ which is chosen in relation to the ohmic resistance $\Omega_F$ of the special service apparatus relays 422, 427, 432, 442, 509, 514, 524 and 529 so that $$\Omega_R<\Omega_F<2\Omega_R$$

It is assumed that the relay 730 and relay 605 are first energized, followed by the energization of relays 735 and 600 over the multiples 309 and 202 respectively and conductor 625 which is common to the relays in the identifying circuit so that the energization of the aforementioned relays occurs in a circuit similar to the one energizing relays 725 and 610 as outlined above. The energization of relays 730 and 605 results in the application of full ground to conductor 822 in a circuit extending from conductor 721, contact 732 of relay 730, conductor 746 and to conductor 822. On the other hand relay 605 closes at its contact 607 a connection for panel 820 in a circuit extending from conductor 826 over conductor 628, contact 607, conductor 629, contact 408, conductor 448, winding of relay 427 and over conductor 447 to battery and ground. Relay 427 registers the identified special service apparatus. The ground on conductor 822 reaches conductor 826 over resistor 832, conductor 825, resistor 833, conductor 823 and resistor 834. Relay 427 will not be able to atract its armature with the connections just described since the resistance on panel 820 is equal to $3\Omega_R$. No danger of operating relay 427 exists in this case, inasmuch as only a series of resistors are used in this arrangement. If however, several parallel circuits were utilized the marginal effect would diminish and the danger of faulty operation again increases. The solution to this problem will be given hereinafter.

The energization of relay 735 and relay 600 results in the application to the panel 820 of a ground connection for conductor 823 over conductor 721, contact 737, conductor 747, conductor 823, resistor 833, conductor 825, conductor 630, contact 602, conductor 629 to relay 427 which is energized since only a resistance of $\Omega_R$ is connected in series with the winding of relay 427. This marginal method requires extremely reliable relays and an equal distribution of connections of the crossing conductors since otherwise parallel circuits for the application of ground to the special service apparatus relays operated by such a panel would exist.

To overcome the possibility of faulty operation of the special service apparatus relays the panels 800 and 840 are provided with non-linear connections between two crossing conductors. These connections may be in the form of diodes of the vacuum tube type, selenium or crystal rectifiers. Every horizontal conductor is arranged to correspond to an outgoing or selected connection whereas every vertical conductor is arranged to correspond to an incoming connection, or a connection to a calling subscriber or a calling exchange or any other calling device, or any equivalent thereof. It is therefore seen that every panel corresponds to one special service apparatus and indicates by the connection thereof the availability of the special service apparatus through the energization of a corresponding relay which is energized in circuits, some of which have been outlined above.

In the special service apparatus register illustrated in the top part of Figs. 4 and 5, ten special service apparatus relays 422, 427, 432, 437, 442, 509, 514, 519, 524 and 529 are shown. The number of relays used in the special service apparatus register will vary in dependence on the telecommunication system and furthermore must be economically chosen as were the number of groups for the multiples. If ten special service apparatus relays are employed the number of panels should also be equal to ten. The special service apparatus relays illustrated in Figs. 4 and 5 constitute the identifying register such as 157 illustrated in Fig. 1. The group of conductors 631 are connected over contacts 409—416 of relay 406 to the special service apparatus relays 432—529 respectively. Like the conductors 627 and 629, the conductors 631 are connected by means not shown in the drawing over the contacts of multiple operated relays 600, 605, 610, 615, 620, etc. to other panels not shown. Thus, if ten panels are available, and therefore ten special service apparatus, eleven contacts have to be provided for each relay. The reason for the extra contact will be more fully described hereinafter. In the same manner every relay of the group 725, 730, 735, 740 has to be provided with eleven contacts for the application of the operating potential to the conductors of the panels. The series of identifying relays 600, 605, 610 and 620 may be enlarged. This has been illustrated in the drawings by arrows shown in dotted lines. If the last mentioned series of identifying relays are enlarged, then the series 725, 730, 735 and 740 as well as the number of panels 800, 820 and 840 have to be correspondingly enlarged.

Several modifications for the identifying circuit will be discussed after explaining the operation of the system illustrated in Figs. 2 to 8. Relays 600, 605, 610, 615, 725, 730, 735 and 740 have one contact more than the number of contacts required for connecting the crossing conductors of the panels to other parts of the system. The stationary contacts of contact 720, 734, 739, and 744 controlled by the identifying relays in the called group are connected to ground over conductor 721 and the armatures of the corresponding relays. The armatures are connected to conductor 748 which is connected to service contacts 604, 609, 614, 619 and 624, the armatures of which are connected to conductor 632. The circuit further extends over the closed contact 417 and conductor 449 which is connected to the armatures 424, 429, 434, 439, 444, 511, 516, 521, 526, and 531 of the special service apparatus relays in the special service apparatus register. When one of the special service apparatus relays is energized, conductor 450 is connected to ground thereby energizing relay 403 since this relay is connected to the battery over conductor 505. The relay 403 is the release relay for disconnecting the identifying circuit from the pertaining register. This relay is operated after the identification of the special service apparatus has been made.

The special service apparatus relays 422—529 close holding circuits for themselves respectively which shunt the energization circuit over the contacts 423, 428, 433, 438, 443, 510, 515, 520, 525 and 530 respectively when the corresponding relays are energized. The holding circuits extend from ground at 701 over conductor 503, cam 502 of the sequence switch, conductor 534, one or more of the above mentioned contacts, the winding of the associated and operated relay or relays, over conductor 447 to battery and ground 702. The operated relays remain energized until the cam 502 breaks the connections.

The special service apparatus relays 422, 427, 432, 437, 442, 509, 514, 519, 524 and 529 effect the registration of the special service apparatus and indicate by the energization thereof which of these apparatus is or are desired. It is possible to design the special service apparatus is or are register so that only one relay is energized at a time. This would however result in a more complicated system. If only one relay is energized at a time it is possible to register the information in the 1-2-4-8-16 code. All of these modifications are based on well-known arrangements.

As already explained the identified special service apparatus are registered by the identification relays 422 to 529. The identification relays are located in identification registers such as for example 157 or 161 illustrated in Fig. 1. Further the identification registers 157 or 161 of Fig. 1 from part of the local or trunk register i. e. REG. I or REG. II. The identification registers feed an arrangement designated by box 451 in Fig. 4 which serves to meet the demand for and actuate the registered special service apparatus such as by completing a connection to be established, by connecting metering devices, to a cord circuit, and so on. The special service apparatus actuating arrangement represented by box 451 is similar to the arrangement discussed with relation to boxes 158 and 162 of REG. I and REG. II of Fig. 1 respectively. The special service apparatus are actuated or connected in a circuit which includes ground supplied over conductor 503, the cam 535 of the sequence switch which is only closed after the identification is made, conductor 536 and over the closed contacts of the group 425, 430, 435, 440, 512, 517, 522, 527 and 532 and back to box 451.

One special service apparatus to be actuated or connected may be, for instance, a means for the restriction to local calls so that, if a caller would attempt to violate such a restriction by dialling a trunk call, the connection is interrupted immediately by the arrangement contained in box 451. Another function to be performed by a special service apparatus may be, for instance, establishing the possibility of dialling secret numbers in such a manner that this is restricted to a few selected subscribers.

If another exchange or another register has to be reached, the identity of identified special service apparatus or part thereof has to be transmitted to the other exchange or register at a predetermined time. In order to accomplish this, the contacts 426, 431, 436, 441, 446, 513, 518, 523, 528 and 533 are provided with the special service apparatus relays 422, 427, 432, 442, 509, 514, 519, 524 and 529 respectively. When these contacts are closed a circuit is established after the contact of cam 535 is closed, for the application of ground to the code converter 537 which converts a code in which the special service apparatus or part thereof is registered into another code in which transmission is possible. It is advantageous, if possible, to register the special service apparatus directly in such a transmission code.

It will be assumed that the normal telegraphic five unit code is used for transmission, but it should be borne in mind that it is equally possible to transmit one or more impulse series such as used for dialing, or involving tone frequencies or potentials. The system in accordance with the invention may be adapted to electrical code transmission of any kind. For the application of the identifying circuits in an automatic telegraph system, which may consist of several exchanges, the incoming trunk registers should be provided with five register relays on which the identification of a distant caller can be registered after being transmitted as a normal signal in the five units code. These relays are in turn provided with a contact pyramid which may be connected parallel to the multiple of identification wires connected to the call finder.

The code converter 537 converts the code identification of the special service apparatus into the transmission code which is transmitted by the transmitter 538. The identities of the special service apparatus are then transmitted over conductor 539, cam 501, over conductor 306 to the engaged register. It will be assumed that the illustrated register is the one which is engaged and that the transmitted identities are received over the cord finder 301 by the identity receiver illustrated in Figs. 2 and 3. In this case cam 501 connects conductor 540 to conductor 306. Since it is assumed that a five unit telegraphic code is used, a receiver having five relays 206, 207, 208, 312 and 313 is shown. The telegraphic receiver connects the afore-mentioned relays successively to the conductor 540. This connection may be performed by a telegraph receiver shaft or a relay arrangement which is indicated in the drawing by the symbol designating rotating connectors 203, 204, 205, 310 and 311.

If energized, the relays 203, 204, 205, 310 and 311 close the holding circuit which extends from ground at 701, over conductor 503, cam 502, conductor 541, the closed contacts of the group 209, 211, 219, 314 and 322, winding of the energized relay and over conductor 447, the battery and ground. The contacts 210, 212—218, 220—226, 315—321 and 323—329 are so arranged that for every energization combination another of the conductors 227 is connected to ground over the armature of contact 210, conductor 228, and contact 418 of relay 406 which is energized when an identification for the particular involved register is to be made. In Fig. 2 the conductors 227 are shown as being part of a calling multiple. These conductors however need not be part of the calling multiple.

In order to render the above explanation clearer a summary of the mode of operation will be given:

(*a*) The register is assumed to be ready to receive the identification of special service apparatus of a stored connection and the sequence switch establishes by means of its cam 502 a circuit for the initiating relay 401 which is energized.

(*b*) Contact 402 of relay 401 closes and prepares a circuit for relay 709 in the gate circuit. Relay 709 is associated with the register under discussion.

(*c*) Relay 709 is energized and the control relay 406 will likewise be energized.

(*d*) By means of contact 419 of relay 406 and cam 501 a ground connection is applied to the multiples and identification of the calling or called part of the connection to be established is made by the relays 600, 605, 610, 615, 620, and 725, 730, 735, 740 respectively.

(*e*) The special service apparatus relays 422, 427, 432, 437, 442, 509, 514, 519, 524, and 529 are energized depending on which of the identifying relays is operated and which connections are made on the panel 800, 820, 840, etc.

(*f*) A circuit for release relay 403 is completed by the identifying relays and the special service apparatus relays.

(*g*) The control relay 406 and the relay 709 in the gate circuit are released by the operation of the release relay 403.

(*h*) If desired, the identity of identified special service apparatus may be transmitted over cam 501 to another register.

It should be noted that if identities of special service apparatus from another register are to be received, it is necessary to receive them before the conclusion of step *d*.

In the example given it has been assumed that the cam 501 and the wiper and bank 301 of the cord finder have to fulfill three functions. It is conceivable and possible to use either three or two wipers and banks for fulfilling the necessary functions. The second register illustrated in Figs. 6 and 7 is designed in similar fashion to the first register discussed above.

When the cam 749 closes its contact, ground is applied in a circuit extending over conductors 721 and 750, cam 749, conductor 751, contact 651 of the release relay 649, conductor 652, winding of relay 647, conductors 653 and 625 to battery 702 and ground. The control relay 647 is therefore energized and by means of its contact 648 signals the gate circuit that an identification is to be made. If the gate circuit is available, relay 715 will be energized in a circuit extending from ground at point 701, over conductor 721, back contact of a change over device 719, back contact of a change over device 716, winding of relay 715, conductor 752, resistor 753, contact 648, conductors 653 and 625 to battery and ground at 702.

Ground is now supplied from point 701 over conductor 721, contacts 705, 708, 711, 714 and 717 in series (provided that none of the associated relays 703, 706, 709, and 712 respectively has been energized) conductor 754, back contact 650 to the winding of the control relay 633 which is energized by the battery 702 over conductor 653.

It is evident that other relays in the gate circuit may be energized in a similar manner over the two pair of conductors 757, 758; 759 and 760.

Inasmuch as no other control relay in another register can operate at the same time that the operation of a predetermined control relay takes place, the register may now supply a ground connection to the multiples over conductor 750, contact 646, conductor 654, cam 755, conductor 756 and wiper and bank 302 of the code finder.

The identification of the special service apparatus is made in a similar manner to that explained hereinabove with respect to the first register. Namely, the identification of the special service apparatus is made over contacts 634—644 which are connected to the special service apparatus register 757. The arrangement utilized in the box designated 758 is similar to the arrangement described in conjunction with the special service apparatus actuating apparatus of box 451. If the identity of the identified special service apparatus are to be transmitted by the transmitter 655, the identification of the identified special service apparatus are preferably first converted, if necessary, into the transmitting code by means of the code converter 656. The transmitted identities are conveyed over conductor 657, cam 755, conductor 756 to the cord circuit. The registered data are received from the cord circuit over conductor 756, cam 755, conductor 759 and the receiver 658 which is similar to the receiver used in the first register. If it is desired to identify the received identification, the code converter 659 is placed into operation by relay 633 over conductor 660 so that the received identification is applied to the multiple 202 by means of receiver 658, conductor 759, sequence switch 755, conductor 756, contact bank and wiper 302 to multiple 202.

Figure 9:
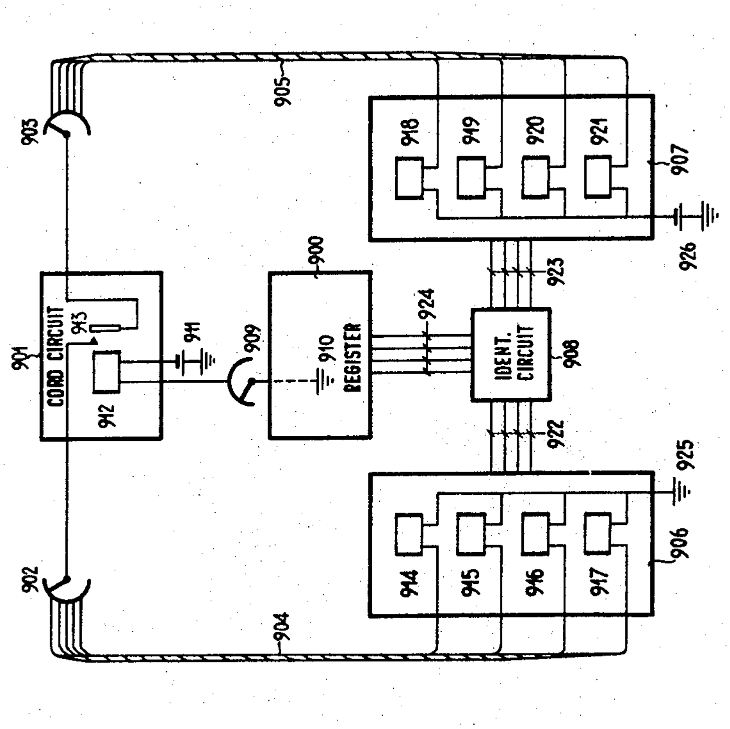
Fig. 9 illustrates a modification of the present invention.
Figure 10:
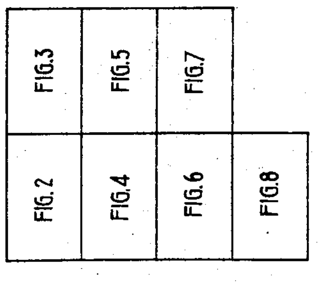
Fig. 10 illustrates how

Fig. 9 illustrates a modification of the arrangement of the identifying relays which are operated over the multiple. The register 900 stores the dialed information either by the position of the identification switches and marking switches or the position of the line finders 902 and selectors 903. If the special service apparatus are of the type which may be identified, the register 900 under the control of a gate circuit (not shown) applies ground 910 to the wiper and bank 909 of the cord circuit finder and the relay 912 in the cord circuit 901. As a result relay 912 is energized and closes its contact 913 since a battery is connected to the other side of the relay winding. A complete circuit then results which extends from ground 925 over one of the relays 914—917, the multiple 904, finder 902, contact 913, selector 903, multiple 905 and one of the relays 918—921, battery 926 and ground. The relays 914—917 and 918—921 represent the relays of the calling and the called subscriber or station, respectively.

The relays 914—917 and 918—921 determine the connections made in the identifying circuit 908 over conductors in the groups 922 and 923. These connections are made in a manner similar to those outlined with respect to the operation of the first register. The identified special service apparatus, identified by the identifying circuit 908 are connected to the register 900 by means of conductors 924.

It should be noted that the arrangement disclosed in my divisional patent application Ser. No. 188,658, filed November 6, 1950, which discloses a code converter, may be employed so that the identification relays may conceivably be replaced by rectifiers without departing from the scope of the invention. Furthermore it will be clear that the horizontal conductors illustrated in Fig. 8 may be connected to each other when controlled by the same relay.

It is also possible to replace the group of relays which supplies ground to the ground-obtaining conductors in the panel in case ground is applied to both sides of the connection by rectifiers, in the event that it is possible for more than one conductor to be connected to ground, or if only one conductor can be connected to ground to connect said ground-obtaining conductor immediately to the multiple.

Another modification may be made in the present invention involving the use of a different code in the multiple e. g. instead of using thirty conductors in a multiple, it may be possible to use in a multiple only five conductors. If five conductors are used in a multiple a large number of rectifiers must be provided at the selectors and finders. The multiple may then be split up again to thirty at the input of the identifying circuit, or instead of splitting the multiple, the same end may be achieved by using a code converter in the identifying circuit.

It will be understood that each of the elements described above, or two or more together, may also find a useful application in other types of telecommunication systems differing from the types described above.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An identifying circuit for a telecommunication system comprising in combination, a plurality of switches having contact banks and wipers, said contact banks being connected with a plurality of subscriber stations; register means for positioning said wipers of said plurality of switches in dependence on dialled information transmitted at one of said plurality of subscriber stations so that a connection between said one of said plurality of subscriber stations may be made with another of said plurality of subscriber stations, said connection requiring the operation of at least one special service apparatus; identifying means for identifying said special service apparatus, the operation of which is required for said connection, and including a first and a second group of relays having contacts and a plurality of cross connecting panels having electrical conductors arranged in two coordinates, the contacts of said first group of relays being connected to one of the coordinates of said electrical conductors, the contacts of said second group of relays being connected to the other coordinate of said electrical conductors; a battery having one of its terminals connected to ground and the other terminal thereof connected to one end of the windings of said first and second group of relays, one of the relays forming part of said first and second group of relays, respectively, being energized when the other end of the winding thereof is connected to ground, said ground connection occurring when the connection between said one of said plurality of subscriber stations is made with said other of said plurality of subscriber stations whereby the contacts of said energized relays form predetermined connections of said electrical conductors arranged in two coordinates; and a gate circuit for connecting said register means to said identifying means.

2. An identifying circuit for a telecommunication system comprising in combination, a plurality of switches having contact banks and wipers, said contact banks being connected with a plurality of subscriber stations; register means for positioning said wipers of said plurality of switches in dependence on dialled information transmitted at one of said plurality of subscriber stations so that a connection between said one of said plurality of subscriber stations may be made with another of said plurality of subscriber stations, said connection requiring the operation of at least one special service apparatus; identifying means for identifying said special service apparatus, the operation of which is required by said connection, and including a first and a second group of relays having contacts and a plurality of cross connecting panels having electrical conductors arranged in two coordinates, the contacts of said first group of relays being connected to one of the coordinates of said electrical conductors, the contacts of said second group of relays being connected to the other coordinate of said electrical conductors; a battery having one of its terminals connected to ground and the other terminal thereof connected to one end of the windings of said first and second group of relays, one of the relays forming part of said first and second group of relays, respectively, being energized when the other end of the winding thereof is connected to ground, said ground connection occurring when the connection between said one of said plurality of subscriber stations is made with said other of said plurality of subscriber stations whereby the contacts of said energized relays form predetermined connections of said electrical conductors arranged in two coordinates; a gate circuit for connecting said register means to said identifying means; and a plurality of storing relays corresponding in number to said plurality of cross connecting panels and cooperating with the same, the energization of said storing relays being effected by predetermined connections of said electrical conductors arranged in two coordinates.

3. An arrangement for a telecommunication system comprising in combination, an exchange having a plurality of registers and a plurality of outlets connected respectively with a plurality of calling and called subscriber stations; an identifying circuit for identifying any special service apparatus required by said plurality of outlets, said identifying circuit including a first and a second group of relays having contacts, and a plurality of cross-connecting panels having electrical conductors arranged in two coordinates, the contacts of said first group of relays being connected to one of the coordinates of said electrical conductors, the contacts of said second group of relays being connected to the other coordinate of said electrical conductors, said plurality of outlets connected respectively with said plurality of calling and called subscriber stations being electrically connected to one end of the windings of said first and second group of relays respectively; a battery having one of its terminals connected to ground and the other terminal thereof connected to the other end of the windings of said first and second group of relays, said relays of said first and second group being energized when said one end of its windings is connected to ground, said ground connection being made to one relay in each of said first and second group of relays when a connection between a calling and a called subscriber station is made; and a gate circuit connected between said identifying circuit and said plurality of registers for preventing simultaneous cooperation of more than one register with said identifying means.

4. An arrangement for a telecommunication system comprising in combination, an exchange having a plurality of registers and a plurality of outlets associated with a plurality of calling and called subscriber stations; an identifying circuit for identifying any special service apparatus required by said plurality of outlets, said identifying circuit including a first and second group of relays having contacts, and a plurality of cross connecting panels having electrical conductors arranged in two coordinates, the contacts of said first group of relays connected to one of the coordinates of said electrical conductors, the contacts of said second group of relays connected to the other coordinate of said electrical conductors, said plurality of outlets associated with said plurality of calling and called subscriber stations being electrically connected to one end of the windings of said first and second group of relays respectively; a battery having one of its terminals connected to ground and the other terminal thereof connected to the other end of the windings of said first and second group of windings, said relays of said first and second group being energized when said one end of its windings is connected to ground, said ground connection being made to one relay in each of said first and second group of relays when a connection between a calling and a called subscriber station is made; a gate circuit connected between said identifying circuit and said plurality of registers for preventing simultaneous cooperation of more than one register with said identifying means; and a plurality of identifying relays corresponding in number to said plurality of cross connecting panels and cooperating with the same, the energization of said identifying relays being effected by predetermined connections of said electrical conductors arranged in two coordinates.

5. An arrangement for a telecommunication system comprising in combination, an exchange having a plurality of registers and a plurality of outlets associated with a plurality of calling and called subscriber stations; an identifying circuit for identifying any special service apparatus required by said plurality of outlets, said identifying circuit including a first and a second group of relays having contacts, and a plurality of cross connecting panels having electrical conductors arranged in two coordinates, the contacts of said first group of relays connected to one of the coordinates of said electrical conductors, the contacts of said second group of relays connected to the other coordinate of said electrical conductors, said plurality of outlets associated with said plurality of calling and called subscriber stations being electrically connected to one end of the windings of said first and second group of relays respectively; a battery having one of its terminals connected to ground and the other terminal thereof connected to the other end of the windings of said first and second group of windings, said relays of said first and second group being energized when said one end of its windings is connected to ground, said ground connection being made to one relay in each of said first and second group of relays when a connection between a calling and a called subscriber station is made; a gate circuit connected between said identifying circuit and said plurality of registers for preventing simultaneous cooperation of more than one register with said identifying means; a plurality of identifying relays corresponding in number to said plurality of cross connecting panels and cooperating with the same, the energization of said identifying relays being effected by predetermined connections of said electrical conductors arranged in two coordinates; and means controlled by said plurality of identifying relays for operating any special service facilities identified by said identifying circuit.

6. An arrangement for a telecommunication system comprising, in combination, a first exchange, a second exchange, said first and second exchanges having a plurality of outlets connected respectively with calling and called subscriber stations belonging to the respective exchanges; means located in each of said exchanges for connecting two of said plurality of outlets so as to effect a connection between a calling and a called subscriber station; an identifying circuit located in each of said exchanges for identifying any special service apparatus required by said connection between said calling and called subscriber station, said identifying circuit including a first and a second group of relays having contacts and a plurality of cross-connecting panels having electrical conductors arranged in two coordinates, the contacts of said first group of relays being connected to one of the coordinates of said electrical conductors, the contacts of said second group of relays being connected to the other coordinate of said electrical conductors, said plurality of outlets connected respectively with calling and called subscriber stations being electrically connected to one end of the windings of said first and second group of relays, respectively; a battery having one of its terminals connected to ground and the other terminal thereof connected to the other end of the windings of said first and second group of relays, said relays of said first and second group being energized when said one end of its windings is connected to ground, said ground connection being made to one relay in each of said first and second group of relays when a connection between a calling and a called subscriber is made; a plurality of identifying relays located in said first exchange and corresponding in number to said plurality of said cross-connecting panels and cooperating with the same, the energization of said identifying relays being effected by predetermined connections of said electrical conductors arranged in two coordinates; means for converting the information being simultaneously stored in said plurality of identifying relays and indicating which special service apparatus is to be used in successive time-positions; means for transmitting said converted information to said second exchange; means located in said second exchange for receiving said converted information and translating the same into a parallel form, so as to be stored simultaneously in a plurality of receiving relays located in said second exchange; and means controlled by said plurality of receiving relays for energizing one relay of said first group of relays located in said second exchange.

References Cited in the file of this patent

UNITED STATES PATENTS

| | | |
|---|---|---|
| 2,373,908 | Ostline | Apr. 17, 1945 |
| 2,387,897 | Gooderham | Oct. 30, 1945 |
| 2,585,904 | Busch | Feb. 19, 1952 |
| 2,779,824 | Nilsson et al. | Jan. 29, 1957 |